United States Patent
Bhatia

(10) Patent No.: US 9,852,590 B2
(45) Date of Patent: *Dec. 26, 2017

(54) SPATIALIZED HAPTIC FEEDBACK BASED ON DYNAMICALLY SCALED VALUES

(71) Applicant: Immersion Corporation, San Jose, CA (US)

(72) Inventor: Satvir Singh Bhatia, Milpitas, CA (US)

(73) Assignee: IMMERSION CORPORATION, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/369,064

(22) Filed: Dec. 5, 2016

(65) Prior Publication Data

US 2017/0084140 A1  Mar. 23, 2017

Related U.S. Application Data

(63) Continuation of application No. 14/467,184, filed on Aug. 25, 2014, now Pat. No. 9,514,620.

(60) Provisional application No. 61/874,678, filed on Sep. 6, 2013.

(51) Int. Cl.
  *G08B 6/00* (2006.01)
  *G05B 15/02* (2006.01)
  *G06F 3/01* (2006.01)

(52) U.S. Cl.
  CPC .............. *G08B 6/00* (2013.01); *G05B 15/02* (2013.01); *G06F 3/016* (2013.01)

(58) Field of Classification Search
  CPC ...................................................... G08B 6/00
  See application file for complete search history.

(56) References Cited

U.S. PATENT DOCUMENTS

| 5,684,722 A | 11/1997 | Thorner et al. |
| 7,623,114 B2 | 11/2009 | Rank |
| 7,979,146 B2 | 7/2011 | Ullrich et al. |
| 8,000,825 B2 | 8/2011 | Ullrich et al. |
| 8,378,964 B2 | 2/2013 | Ullrich et al. |
| 8,441,437 B2 | 5/2013 | Rank |
| 8,686,941 B2 | 4/2014 | Rank |

(Continued)

FOREIGN PATENT DOCUMENTS

WO     2012028973 A1    3/2012

OTHER PUBLICATIONS

Any information that are not included with this Information Disclosure Statement can be found in U.S. Appl. No. 14/467,184.

*Primary Examiner* — Brent Swarthout
(74) *Attorney, Agent, or Firm* — Miles & Stockbridge P.C.

(57) ABSTRACT

A system provides haptic feedback based on media content. The system processes the media content into components including a first component and a second component. The system further determines a first priority value related to the first component and a second priority value related to the second component. The system further compares the first priority value with the second priority value. The system further generates a first control signal and a second control signal based on the comparison, where the first control signal is configured to cause a first haptic feedback to be output and the second control signal is configured to cause a second haptic feedback to be output that is the same or different than the first haptic feedback.

22 Claims, 9 Drawing Sheets

(56) References Cited

U.S. PATENT DOCUMENTS

| | | |
|---|---|---|
| 8,688,251 B2 | 4/2014 | Ullrich et al. |
| 8,717,152 B2 | 5/2014 | Bhatia et al. |
| 8,754,757 B1 | 6/2014 | Ullrich et al. |
| 8,754,758 B1 | 6/2014 | Ullrich et al. |
| 8,761,915 B2 | 6/2014 | Ullrich et al. |
| 9,158,379 B2 | 10/2015 | Cruz-Hernandez et al. |
| 9,245,429 B2 | 1/2016 | Cruz-Hernandez et al. |
| 9,443,401 B2 | 9/2016 | Weddle et al. |
| 9,514,620 B2* | 12/2016 | Bhatia ........................ 340/407.1 |
| 2007/0038164 A1 | 2/2007 | Afshar |
| 2009/0231276 A1* | 9/2009 | Ullrich .................... G06F 3/016 345/157 |
| 2011/0128132 A1 | 6/2011 | Ullrich et al. |
| 2012/0206246 A1 | 8/2012 | Cruz-Hernandez et al. |
| 2012/0306631 A1* | 12/2012 | Hughes ................ G09B 21/009 340/407.1 |
| 2013/0131851 A1 | 5/2013 | Ullrich et al. |
| 2013/0165226 A1 | 6/2013 | Thorner |
| 2013/0207917 A1 | 8/2013 | Cruz-Hernandez et al. |
| 2013/0227410 A1* | 8/2013 | Sridhara .............. H04N 21/235 715/702 |
| 2013/0265286 A1 | 10/2013 | Da Costa et al. |
| 2013/0335209 A1 | 12/2013 | Cruz-Hernandez et al. |
| 2014/0056461 A1 | 2/2014 | Afshar |
| 2014/0064516 A1 | 3/2014 | Cruz-Hernandez et al. |
| 2014/0118125 A1 | 5/2014 | Bhatia |
| 2014/0143682 A1* | 5/2014 | Druck .................. G06Q 10/107 715/752 |
| 2014/0176415 A1 | 6/2014 | Buuck et al. |
| 2014/0300454 A1 | 10/2014 | Lacroix et al. |
| 2014/0340209 A1 | 11/2014 | Lacroix et al. |
| 2014/0354570 A1 | 12/2014 | Makinen et al. |
| 2015/0070260 A1 | 3/2015 | Saboune et al. |
| 2015/0070261 A1 | 3/2015 | Saboune et al. |
| 2016/0008206 A1* | 1/2016 | Devanaboyina ....... A47C 9/002 601/136 |

* cited by examiner

SPATIALIZED HAPTIC FEEDBACK BASED ON DYNAMICALLY SCALED VALUES

CROSS-REFERENCE TO RELATED APPLICATIONS

This application is a continuation of U.S. patent application Ser. No. 14/467,184, filed on Aug. 25, 2014, now U.S. Pat. No. 9,514,620 (hereby incorporated by reference) which claims priority of U.S. Provisional Patent Application Ser. No. 61/874,678, filed on Sep. 6, 2013 (the disclosure of which is hereby incorporated by reference).

FIELD

One embodiment is directed generally to a device, and more particularly, to a device that produces haptic effects.

BACKGROUND

Electronic device manufacturers strive to produce a rich interface for users. Conventional devices use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects". Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

Dynamically providing haptic feedback based on media components of media content can provide a powerful and immersive experience for the user. However, in some instances, the different media components can have media characteristics that are different but sufficiently similar such that haptic feedbacks dynamically generated based on the media components are difficult to distinguish. For example, in a stereo audio implementation, haptic feedback corresponding to the "right" audio channel and provided via a "right" haptic feedback output device may be indistinguishable from haptic feedback corresponding to the "left" audio channel and provided via a "left" haptic feedback output device when audio for the right and left audio channels are sufficiently similar. In the foregoing example, the user may not perceive a difference between the haptic feedbacks corresponding to the right and left channels.

SUMMARY

One embodiment is a system that provides haptic feedback based on media content. The system processes the media content into components including a first component and a second component. The system further determines a first priority value related to the first component and a second priority value related to the second component. The system further compares the first priority value with the second priority value. The system further generates a first control signal and a second control signal based on the comparison, where the first control signal is configured to cause a first haptic feedback to be output and the second control signal is configured to cause a second haptic feedback to be output that is the same or different than the first haptic feedback.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Figure 1:
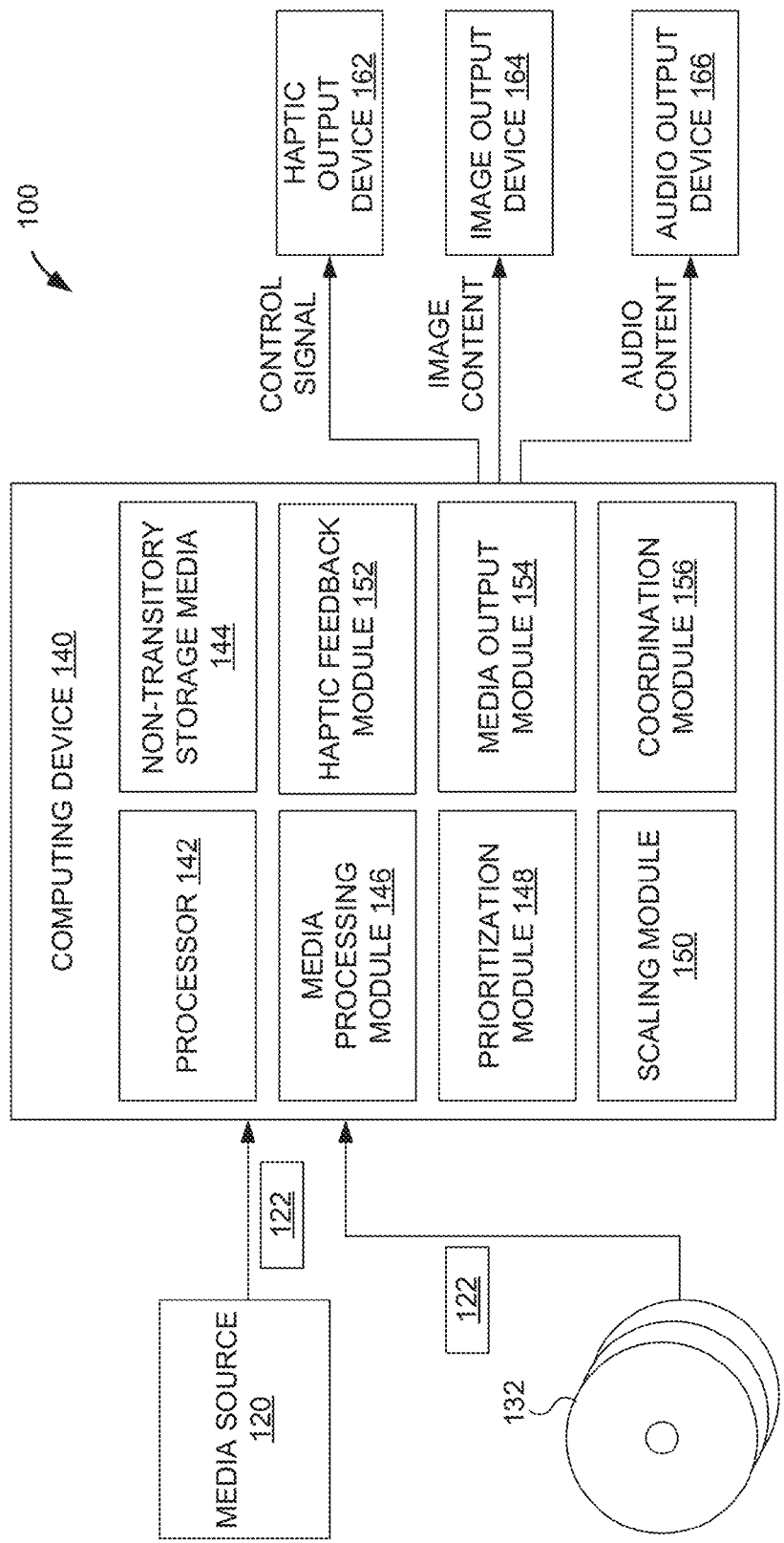
FIG. 1 illustrates a system for providing haptic feedback based on dynamically scaled priority values of media components of media content, according to an embodiment of the invention.

One embodiment is a system that provides haptic feedback that varies spatially based on dynamically scaled values of media components, such as audio channels, regions of an image, or other media components of media content. The system may analyze the media components and automatically generate haptic feedback based on the analysis. The system may provide the haptic feedback via haptic output devices in coordination with output of the media components via speakers, image displays, or other media output devices. Thus, a given media component may be output along with its corresponding haptic feedback, which can be determined dynamically by the system.

In order to emphasize certain haptic feedback that is based on certain media components over other haptic feedback that is based on other media components, the system may scale one or more portions of the haptic feedback based on an analysis of the media components. For example, the system may scale information that causes haptic feedback to be generated, causing certain haptic feedback to be more pronounced (e.g., increased magnitude, duration, etc.) and/or causes other haptic feedback to be less pronounced (e.g., decreased magnitude, duration, etc.). The system may scale the information such that the original media components are unaltered when played back by image, audio, and/or other output components. In other words, the original media content may be played back unaltered while certain haptic feedback automatically generated from the media content is more or less pronounced than other haptic feedback (although in some implementations, the media content may be separately and/or together scaled with the haptic feedback as well). The system therefore facilitates dynamic haptic feedbacks that can be distinguished by the user even when such haptic feedbacks are based on media components that are similar to one another.

In this manner, the system can improve the ability to distinguish between different haptic feedback that is provided in association with different media components and can provide a richer, more immersive media experience. Such enhancements can be applied to audio, images (such as video or still images), video games, and/or other media content.

In one embodiment, the system may prioritize the media components and generate a control signal that causes haptic output devices to provide haptic feedback based on the prioritization. In some implementations, for example, the system may process media content into different media components and analyze each of the media components to automatically determine a corresponding priority value used to dynamically determine haptic feedback. The analysis may be based on one or more media properties of a given media component. The media properties may include, for example, a magnitude of sound (among other audio properties) for audio content, a color (among other image properties) for image content, and/or other properties of media content that can be quantified or otherwise evaluated for analysis.

The system may compare each of the priority values of media components with a priority value (or aggregate value, such as an average) of at least one other media component. If a difference between the priority values exceeds a threshold value, the priority value may be scaled up or down. Thus, some priority values may be scaled up, others may be scaled down, while still others may not be scaled at all. In this manner, the haptic feedback that is generated based on the priority values for media components may be more distinguishable due to the scaling. In some implementations, the system may scale the priority values irrespective of whether a threshold difference is reached such that the level of scaling may be based on the difference between priority values. It should be understood that "scaling the priority values" or similar language may include scaling actual media component values (e.g., audio levels) and/or generating new values based on actual media component values for the purpose of generating scaled haptic feedback based on media content.

For example, in a stereo embodiment involving audio content with a left channel and a right channel, if an excepted haptic effect is to be played at a right haptic output device, but not a left haptic output device, the system can scale a portion of the audio content associated with the right channel in an upwards direction, and can scale a portion of the audio content associated with the left channel in a downward direction. The system can further generate a haptic effect based on the scaled portion of the audio content associated with the right channel and cause the haptic effect to be output at the right haptic output device. Likewise, the system can further generate a haptic effect based on the scaled portion of the audio content associated with the left channel and cause the haptic effect to be output at the left haptic output device. Thus, based on the dynamic scaling, the haptic effect that is output at the right haptic output device can be more "pronounced" or "augmented," whereas the haptic effect that is output at the left haptic output device can be more "diminished."

FIG. 1 illustrates a system 100 for providing haptic feedback based on dynamically scaled values of media components of media content 122, according to an embodiment of the invention. System 100 may include a media source 120, a computing device 140, a haptic output device 162, an image output device 164, an audio output device 166, and/or other components. Although only single instances of the aforementioned components are illustrated in FIG. 1, more than one of such components may be included. Media content 122 may include audio content, image content (e.g., video, still images, visual representations of video games, etc.), and/or other content. Examples of audio content can include 5.1 multi-channel audio, 6.1 multi-channel audio, 7.1 multi-channel audio, 11.1 multi-channel audio, etc. Media content 122 may be configured as video, audio, a video game representation, and/or other media that can be played or otherwise output.

In some embodiments, media source 120 may include an online media provider, such as an online video provider or game server, a media player, such as a disc player or video game console, another computing device, and/or other device that can provide media 122 to computing device 140.

In some embodiments, computing device 140 may include one or more processors 142 programmed with one or more computer program modules, which may be stored in one or more non-transitory storage media 144. Computing device 140 may be programmed by the one or more modules to prioritize media components of media content 122 and scale haptic feedback based on the prioritization. The modules may include a media processing module 146, a prioritization module 148, a scaling module 150, a haptic feedback module 152, a media output module 154, a coordination module 156, and/or other modules. In alternate embodiments, computing device 140 may be programmed by a single module, such as a haptic spatialization module (not illustrated in FIG. 1), to prioritize media components of media content 122 and scale haptic feedback based on the prioritization.

In some embodiments, media processing module 146 may be configured to obtain media content 122 from media source 120, computer readable media 132, non-transitory storage media 144 (e.g., when media content 122 is stored locally at computing device 140), and/or other sources of media content 122. For example, media content 122 may be streamed, downloaded, copied, stored locally, created locally (e.g., via a media capture device not illustrated in FIG. 1), or otherwise obtained by media processing module 146.

Whichever manner in which media content 122 is obtained, media processing module 146 may be configured to buffer media content 122 in a memory to process media content 122 into one or more media components, such as audio channels for audio content and image regions for image content.

For example, media content 122 may include audio content that is encoded with a stereo (i.e., dual channel) or surround (i.e., multi-channel) sound format. In these instances, media processing module 146 may decode media content 122 (e.g., audio portions thereof) into separate audio channels using conventional stereo/multi-channel audio decoding techniques used for delivering different audio channels to individual audio output devices, such as speakers.

Media content 122 may additionally or alternatively include image content that includes multiple streams (e.g., for separate display screens) and/or a single stream that can be divided into separate regions of the image. In these instances, media processing module 146 may process media content 122 (e.g., image portions thereof) using conventional image processing techniques, such as image segmentation to segment an image into multiple regions. Each region may be grouped based on clusters of pixels or grouped using other conventional image processing techniques.

In some embodiments, prioritization module 148 may analyze individual media components and determine a priority value for each media component based on the analysis. The analysis may be performed in real-time such that as each media component is to be output by a media output device, the priority value of the media component may be determined. Alternatively, the analysis may be performed such that results of the analysis are stored for later processing.

In embodiments where media content 122 includes audio content, prioritization module 148 may sample the audio content to determine an audio characteristic of an audio channel. The audio characteristic may include a magnitude of the audio and/or other characteristic of the audio channel.

In some embodiments, prioritization module 148 may sample the audio content at a particular frame rate. Each frame of audio content may be processed such that the characteristic of the frame may be analyzed to determine an audio characteristic of the audio frame. For each sampled portion (e.g., one or more frames) of the audio content, prioritization module 148 may determine the audio characteristic for a given frame or other portion of the audio content. Processing the audio content may be implemented using the system as disclosed in co-owned U.S. patent application Ser. No. 13/365,984, filed on Feb. 3, 2012, entitled "Sound to Haptic Effect Conversion System using Amplitude Value," (herein incorporated by reference in its entirety) and U.S. patent application Ser. No. 13/366,010, filed on Feb. 3, 2012, entitled "Sound to Haptic Effect Conversion System using Waveform," (herein incorporated by reference in its entirety).

In some embodiments, prioritization module 148 may determine the priority value based on the audio characteristic. For example, the priority value may be equal to or otherwise derived from a value of the audio characteristic. Differences of priority values in audio embodiments may indicate different levels, types, duration, etc., of sound for different audio channels, which the system may use as the basis for providing haptic feedback that varies spatially.

In embodiments where media content 122 includes image content, prioritization module 148 may determine a Hue Saturation Value ("HSV") color histogram or other image processing values for a given segmented region of an image (e.g., a still image or a frame of a video image) and determine whether the HSV color histogram is different from one image region to another region. When separate video streams are used, prioritization module 148 may determine a HSV value or other value obtained based on image processing for each stream.

The presence of a different object or differences in the scene may be indicated when the HSV color histogram differs from one region to another or from one image stream to another image stream, which the system may use as the basis for providing haptic feedback that varies spatially. Other image variations may be used as the basis for providing haptic feedback that varies spatially as well.

In some embodiments, prioritization module 148 may generate or otherwise obtain a timestamp related to each frame and store the sampled media characteristic in relation to the timestamp. In this manner, the media characteristics may be stored in relation to the timestamps for coordination of haptic feedback and output of media content 122.

In some embodiments, scaling module 150 may be configured to compare the priority values determined for each of the media components and determine whether such values should be scaled based on the comparison. The comparison may be performed based on various techniques.

In some embodiments, for example, scaling module 150 may perform pairwise comparisons of each of the priority values to determine whether a difference between a given pair of priority values exceeds a predetermined threshold value such that scaling should be performed. The foregoing example may be useful when two media components are analyzed (such as for stereo audio embodiments), although such comparison may be applied when other numbers of media components are analyzed as well. The foregoing and other threshold values described herein may be configurable such that individual vendors/entities may adjust the threshold values.

In some embodiments, scaling module 150 may determine an average of priority values for two or more of the media components and determine whether a difference between a given priority value and the average exceeds a predetermined threshold value (which may be the same or different from the aforementioned threshold value). In some of these embodiments, scaling module 150 may determine a standard deviation and perform various statistical techniques to determine whether the priority values vary beyond a threshold variance such that scaling should be performed. The foregoing example may be useful when a plurality of media components are analyzed (such as for surround audio embodiments), although such comparison may be applied when other numbers of media components are analyzed as well.

Regardless of how the priority values are compared, in some embodiments, scaling module 150 may scale one or more of the priority values. For example, scaling module 150 may generate a scaled value that is higher or lower than the original priority value. When the difference between the priority values of a pair of priority values exceeds the predetermined threshold value, scaling module 150 may scale up the higher of the two priority values and/or scale down the lower of the two priority values. Similarly, when the difference between a given priority value and the average of a plurality of priority values exceeds the predetermined threshold value, scaling module 150 may scale up the given priority value if the given priority value is higher than the average and scale down the given priority value if the given priority value is lower than the average. In some embodiments, scaling module 150 may determine baseline haptic feedbacks to provide based on non-scaled priority values. In these embodiments, scaling module 150 may determine a difference between a characteristic of the haptic feedbacks (e.g. magnitudes, frequencies, durations, etc.) and scale the haptic feedback characteristics with respect to one another.

Whichever embodiment of scaling is performed, scaling module 150 may enhance the difference between two or more priority values that each is determined for a given media component. This allows a first haptic feedback for a corresponding priority value to be provided at a first spatial position that is more individually perceptible than a second haptic feedback that is provided at a second spatial position.

On the other hand, when the difference does not exceed the predetermined threshold, scaling module 150 may not scale the priority values. This may be the case when the difference in media components should not necessarily be perceptibly different (e.g., when loud explosions are occurring across different audio channels).

In some embodiments, haptic feedback module 152 may be configured to generate control signals based on scaled priority values (for priority values that are scaled) and/or the non-scaled priority values (for priority values that are not scaled). For example, haptic feedback module 152 may be configured to generate a first control signal based on a first priority value (which may or may not be scaled) and generate a second control signal based on a second priority value (which may or may not be scaled). Other control signals may be generated for other priority values corresponding to other media components as well. The first control signal may be configured such that it causes a first haptic output device to provide a first haptic feedback. Likewise, the second control signal may be configured such that it causes a second haptic output device to provide a second haptic feedback.

As used herein with respect to control signals, the terms "first control signal" and "second control signal" (and similar language that individually identify control signals) are intended to convey that different haptic output devices may be caused to provide different haptic feedback. In some embodiments, for example, the "first control signal" and the "second control signal" may be separately provided to first and second haptic output devices, which each cause haptic feedback to be provided based on their respective control signals. In some embodiments, the "first control signal" and the "second control signal" may be together provided to both first and second haptic output devices with appropriate addressing mechanisms such that the first and second haptic output devices decode the addressing mechanisms to determine which haptic feedback to output.

In some embodiments, the prioritized values may be stored in association with corresponding haptic feedback to be provided in a lookup table stored in a memory, such as non-transitory storage media 144, and/or may be dynamically determined based on priority values. For example, the priority values may be used to determine a characteristic (e.g., magnitude) of haptic feedback such that a higher priority value results in a higher magnitude haptic feedback.

In some embodiments, media output module 154 may be configured to output media content 122. Media output module 152 may provide media 122 using conventional media formats to, for example, image output device 164, audio output device 166, and/or other media output device.

In some embodiments, coordination module 156 may be configured to coordinate media output and control signal output respectively to media output devices (e.g., image output device 164 and audio output device 166) and haptic output devices 162. In some embodiments, coordination module 156 may synchronize the image output, control signal (e.g., haptic feedback caused by the control signal), and audio output according to a synchronizing code embedded into media content 122 and/or via time stamps that generally set a time for outputting each of the video output, audio output, and haptic feedback.

As would be appreciated, media content 122 may include both audio content and video content. Computing device 140 may process audio, video, and/or other media of media content 122 as described herein to provide haptic feedback that varies spatially.

In some embodiments, haptic output device 162 may include an actuator, for example, an electromagnetic actuator, such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electro-active polymers, or shape memory alloys, a macro-composite fiber actuator, an electro-static actuator, an electro-tactile actuator, and/or another type of actuator that provides a physical feedback, such as a haptic (e.g., vibrotactile) feedback. The haptic output device 162 may include non-mechanical or non-vibratory devices, such as those that use electrostatic friction ("ESF"), ultrasonic surface friction ("USF"), or those that induce acoustic radiation pressure with an ultrasonic haptic transducer, or those that use a haptic substrate and a flexible or deformable surface, or those that provide projected haptic output, such as a puff of air using an air jet, and so on.

In some embodiments, image output device 164 may include a display, such as a touchscreen display, a monitor, and/or other display that can display the image content such as videos, still images, game representations, etc. In some embodiments, audio output device 166 may include speakers, headphones, or other devices that can emit audio. In some embodiments, image output device 164, haptic output device 162, and/or audio output device 166 may be integrated with computing device 140. In some embodiments, image output device 164, haptic output device 162, and/or audio output device 166 may be housed separately from computing device 140.

In some embodiments, media source 120 may be programmed with the modules discussed in relation to computing device 140. Thus, at least some or all of the functions described above with respect to computing device 140 may be performed at media source 120.

Non-transitory storage media 144 may include one or both of system storage that is provided integrally (i.e., substantially non-removable) with computing device 140 and/or removable storage that is removably connectable to computing device 140 via, for example, a port (e.g., a universal serial bus ("USB") port, a firewire port, etc.) or a drive (e.g., a disk drive, etc.). Non-transitory storage media 144 may include one or more of optically readable storage media (e.g., optical disks, etc.), magnetically readable storage media (e.g., magnetic tape, magnetic hard drive, floppy drive, etc.), electrical charge-based storage media (e.g., electronically erasable programmable read-only memory ("EEPROM"), random-access memory ("RAM"), etc.), solid-state storage media (e.g., flash drive, etc.), and/or other electronically readable storage media. Non-transitory storage media 144 may include one or more virtual storage resources (e.g., cloud storage, a virtual private network, and/or other virtual storage resources). Non-transitory storage media 144 may store software algorithms, information determined by processor(s) 142, information received from computing device 140, and/or other information that enables computing device 140 to function as described herein.

Processor(s) 142 are configured to provide information processing capabilities in computing device 140. As such, processor(s) 142 may include one or more of a digital processor, an analog processor, a digital circuit designed to process information, an analog circuit designed to process information, a state machine, and/or other mechanisms for electronically processing information. Although processor(s) 142 is illustrated in FIG. 1 as a single entity, this is for illustrative purposes only. In some embodiments, processor(s) 142 may include a plurality of processing units. These processing units may be physically located within the same device, or processor(s) 142 may represent processing functionality of a plurality of devices operating in coordination. Processor(s) 142 may be configured to execute modules by software; hardware; firmware; some combination of software, hardware, and/or firmware; and/or other mechanisms for configuring processing capabilities on processor(s) 142.

The various modules described herein are example modules only. Other configurations and numbers of modules may be used, as well using non-modular approaches so long as the one or more physical processors are programmed to perform the functions described herein. It should be appreciated that although the various modules are illustrated in FIG. 1 as being co-located within a single processing unit, in embodiments in which processor(s) 142 includes multiple processing units, one or more modules may be located remotely from the other modules. The description of the functionality provided by the different modules described herein is for illustrative purposes, and is not intended to be limiting, as any of modules may provide more or less functionality than is described. For example, one or more of the modules may be eliminated, and some or all of its functionality may be provided by other ones of the modules. As another example, processor(s) 142 may be configured to execute one or more additional modules that may perform some or all of the functionality attributed herein to one of modules.

The components illustrated in FIG. 1 may be communicably coupled to one another via various communication links, such as a network. The network may include wired or wireless connections. In some aspects of the invention, the network may include any one or more of, for instance, the Internet, an intranet, a Personal Area Network ("PAN"), a Local Area Network ("LAN"), a Wide Area Network ("WAN"), a Storage Area Network ("SAN"), a Metropolitan Area Network ("MAN"), a wireless network, a cellular communications network, a Public Switched Telephone Network ("PSTN"), and/or other network.

Various inputs, outputs, configurations, and/or other information described herein as being stored or storable may be stored in one or more databases (not illustrated in FIG. 1). Such databases may be, include, or interface to, for example, an Oracle™ relational database sold commercially by Oracle Corporation. Other databases, such as Informix™ Database 2 ("DB2") or other data storage, including file-based, or query formats, platforms, or resources, such as On Line Analytical Processing ("OLAP"), Standard Query Language ("SQL"), a SAN, Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Although not illustrated in FIG. 1, media content 122 may include different sensor information. In some embodiments, the different sensor information may be associated with different objects on the image. Each of the sensor information may be separated by media processing module 146 and prioritized and scaled as described herein with respect to other media components. As such, computing device 140 may prioritize, scale, and provide dynamic haptic feedback on various types of information included in media content 122.

Figure 2:
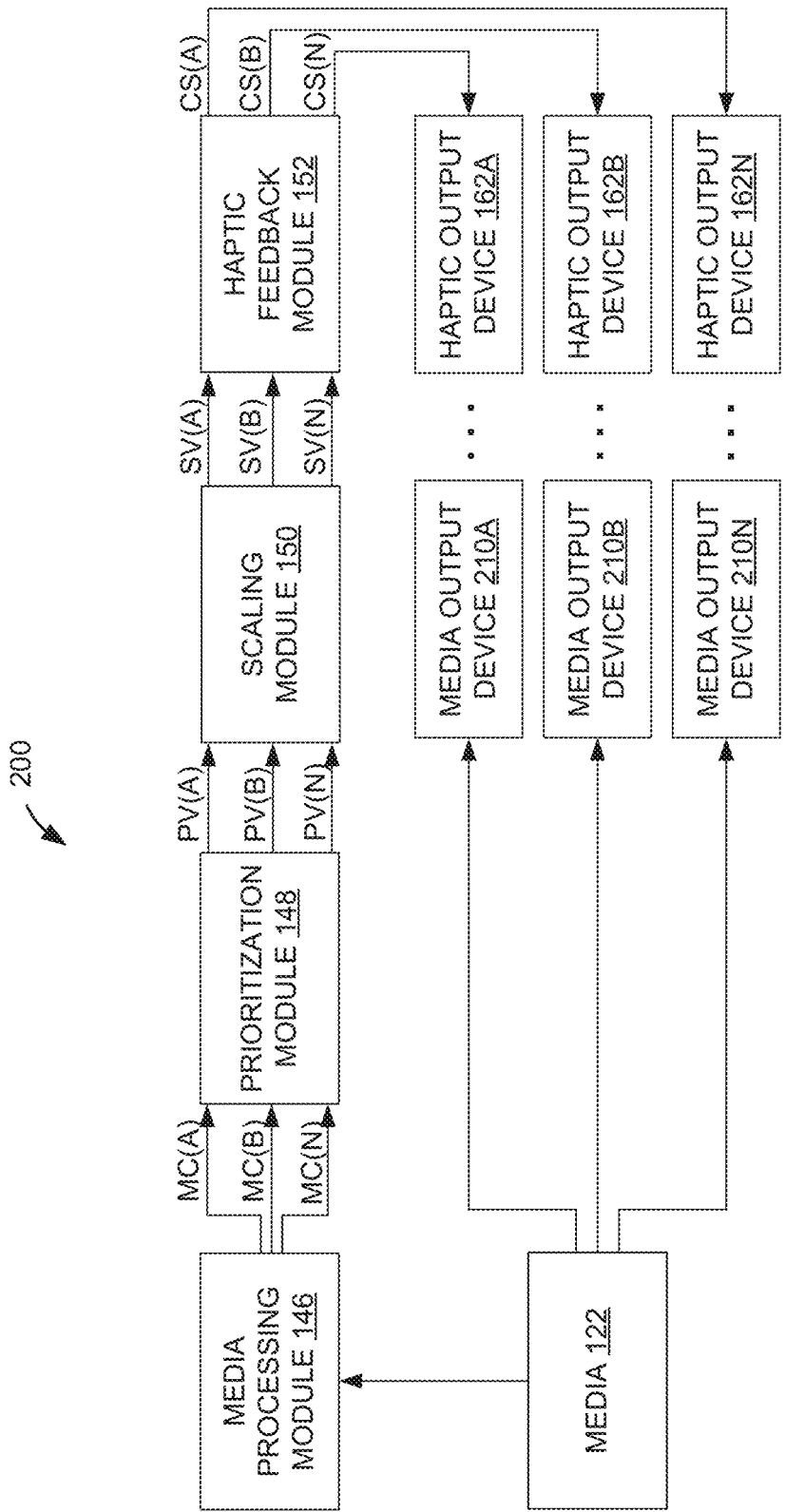
FIG. 2 is a flow diagram illustrating data flows between components in a system for providing haptic feedback based on dynamically scaled priority values of media components of media content, according to an embodiment of the invention.

FIG. 2 is a flow diagram 200 illustrating data flows between components in system 100 for providing haptic feedback based on dynamically scaled priority values of media components of media content, according to an embodiment of the invention. Various haptic output devices 162 (illustrated in FIG. 2 as haptic output devices 162A, 162B, . . . , 162N) may be collocated or otherwise associated with (illustrated in FIG. 2 as ellipses) corresponding media output devices 210 (illustrated in FIG. 2 as media output devices 210A, 210B, 210N). Media output devices 210 may include audio output devices, image output devices, and/or other types of media output device. Haptic output devices 162 may be configured to output haptic feedback that is dynamically generated and scaled based on media content 122. The haptic feedback may be output in coordination with the output of media content 122 via haptic output device 162, enriching the media experience for user(s).

In some embodiments, media processing module 146 may obtain media content 122 and process the media content into a plurality (e.g., two or more) of media components (illustrated in FIG. 2 as MC(A), MC(B), and MC(N)). Prioritization module 148 may determine priority values (illustrated in FIG. 2 as PV(A), PV(B), and PV(N)) for corresponding media components. Scaling module 150 may compare the priority values and scale each priority value to generate scaled priority values (illustrated in FIG. 2 as SV(A), SV(B), and SV(N)). In some embodiments, scaling module 150 may not perform scaling on one or more of the priority values such that a given scaled priority value is equal to the non-scaled priority value from prioritization module 150.

In some embodiments, scaling module 150 scales up or down a given priority value only when a difference between the given priority value and another value exceeds a threshold value.

For example, when a difference between the given priority value and another priority value exceeds a predetermined threshold, scaling module 150 may scale the given priority value up or down and/or scale the other priority value up or down. In some embodiments, the given priority value is scaled up and the other priority value is scaled down.

In another example, when a difference between the given priority value and an average of priority values among a population of priority values exceeds a predetermined threshold value, scaling module 150 may scale the given priority value up and/or down, depending on whether the given value is above or below the average (e.g., the given priority value may be scaled up when above the average and scaled down when below the average). Scaling module 150 may perform scaling based on other criteria as well.

In yet another example, when a standard deviation among a population of priority values is or exceeds a predetermined threshold value, scaling module 150 may determine whether to perform scaling on the population of priority values, and then perform individualized scaling as described herein.

Based on the scaled priority values (which may include non-scaled priority values), haptic feedback module 152 may generate corresponding control signals (illustrated in FIG. 2 as CS(A), CS(B), and CS(N)). Each of the control signals may be configured to cause a corresponding haptic feedback device 162 to output haptic feedback in coordination with media output by media output devices 210.

In other embodiments, scaling module 150 may perform scaling without respect to whether the difference exceeds the predetermined threshold. In these embodiments, scaling module 150 may scale priority values when there exists a non-zero difference between the priority values.

Figure 3A:
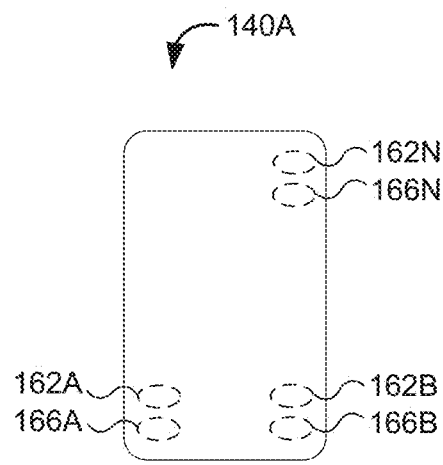
FIG. 3A illustrates an example of a computing device for prioritizing audio channels with integrated haptic and audio output devices, according to an embodiment of the invention.

FIG. 3A illustrates an example of a computing device 140A for prioritizing audio channels with integrated haptic output devices 162 (illustrated in FIG. 3A as haptic output devices 162A, 162B, 162N) and audio output devices 166 (illustrated in FIG. 3A as audio output devices 166A, 166B, 166N), according to an embodiment of the invention. Although illustrated as having two haptic devices 162 (i.e., 162A and 162B) and two audio output devices 166 (i.e., 166A and 166B), computing device 140A may include additional integrated haptic and audio output devices (i.e., 162N and 166N).

As illustrated, computing device 140A may be used for outputting stereo audio and coordinating output of haptic feedback that is based on scaling priority values related to corresponding audio channels. For example, computing device 140A may determine "right" and "left" priority values based on an analysis of "right" and "left" audio channels. Computing device 140A may cause "right" and "left" haptic feedbacks to be output in conjunction with output of the right and left audio channels through right and left speakers. The right haptic feedback may be based on the right priority value and the left haptic feedback may be based on the left priority value. As such, when the right and left priority values are different but similar to one another, right and left haptic feedback may be difficult to distinguish, particularly in embodiments where computing device 140A includes a handheld device. By scaling the right priority values and/or the left priority values, computing device 140A may generate right and left haptic feedbacks that are distinguishable from one another, thereby enhancing the dynamically determined haptic feedbacks.

Computing device 140A may output the right and left audio channels via left audio output device 166A and right audio output device 166B and coordinate such output with left and right haptic feedbacks via left haptic output device 162A and right haptic output device 162B. Because the left haptic feedback and/or the right haptic feedback is based on scaled priority values of the left and right audio channels, the user may distinguish the left and right haptic feedbacks even if the left and right audio channels each include audio that is similar to one another.

Figure 3B:
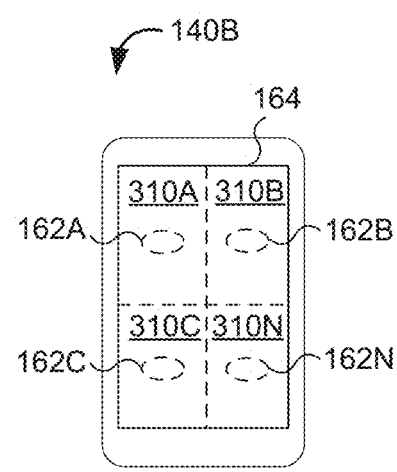
FIG. 3B illustrates an example of a computing device for prioritizing image components with integrated haptic and image output devices, according to an embodiment of the invention.

FIG. 3B illustrates an example of a computing device 140B for prioritizing image components with integrated haptic output devices 162 (illustrated in FIG. 3B as haptic output devices 162A, 162B, 162C, 162N) and image output device 164, according to an aspect of the invention. As illustrated, image output device 164 may include a touch screen display and/or other type of display that can output image content (e.g., video, still images, game representations, etc.). Image output device 164 may be separated into display regions 310 (illustrated in FIG. 3B as display regions 310A, 310B, 310C, 310N). The display regions 310 may be conceptual (e.g., software-based) or actual (e.g., include individual hardware displays).

Each of the display regions 310 may be configured to display a corresponding region of image content and be associated with a corresponding haptic output device 162 (i.e., one of haptic output devices 162A, 162B, 162C, 162N). Computing device 140B may process each region of image content using conventional image processing techniques and determine corresponding priority values. Scaling and generation of control signals may be performed as described herein to provide distinct haptic feedbacks to haptic output devices 162.

Figure 4:
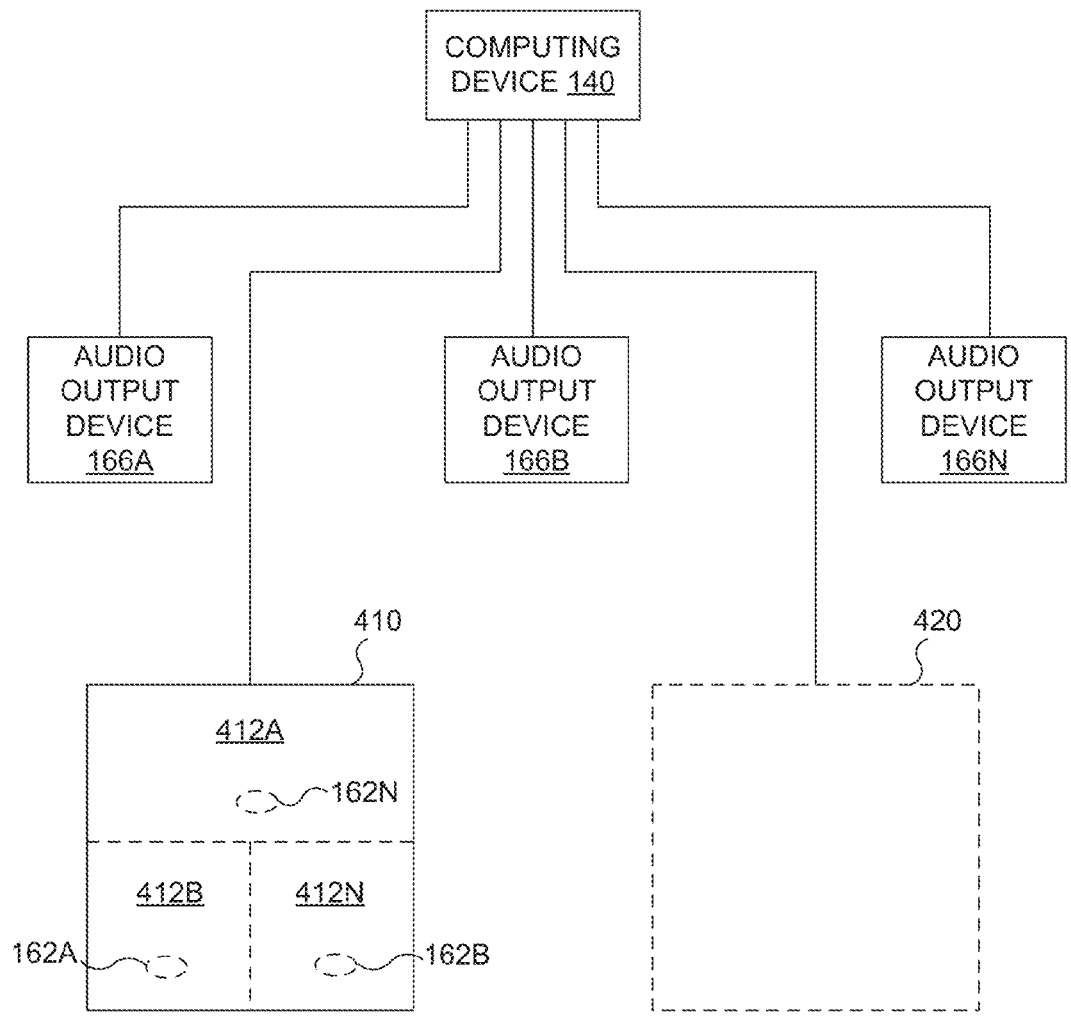
FIG. 4 illustrates an example of a computing device for prioritizing audio channels with remote haptic and audio output devices, according to an embodiment of the invention.

FIG. 4 illustrates an example of a computing device 140 for prioritizing audio channels with remote haptic output devices 162 (illustrated in FIG. 4 as haptic output devices 162A, 162B, 162N) and audio output devices 166 (illustrated in FIG. 4 as audio output devices 166A, 166B, 166N), according to an embodiment of the invention. FIG. 4 further illustrates apparatus 410. Apparatus 410 may be separated into software-derived or actual regions 412 (illustrated in FIG. 4 as regions 412A, 412B, 412N). The relative positioning of regions 412 may correspond to the relative positioning of audio output devices 166.

In some embodiments, apparatus 410 may be configured as a chair having distinct regions, each having a corresponding haptic output device 162 (i.e., one of haptic output devices 162A, 162B, 162N). Each of the distinct regions may correspond to an audio output device 166 (i.e., one of audio output devices 166A, 166B, 166N) such that computing device 140 coordinates output of audio at a given audio output device 166 with haptic feedback output to a corresponding haptic output device 162 at a position in the chair that corresponds with the position of the given audio output device 166. For example, audio output at a "middle" audio output device 166 may be coordinated with haptic feedback provided via a "middle" haptic output device 162. FIG. 4 further illustrates apparatus 420. Although illustrated in shadow outline, apparatus 420 may have a configuration that is similar to apparatus 410. Other numbers of haptic and audio output devices 166 may be used as well.

Although not illustrated, image content may be additionally or alternatively coordinated with apparatus 410 such that different image regions may be prioritized and scaled, and have haptic feedback provided via corresponding haptic output devices 162.

Referring to FIGS. 5A, 5B, 5C, and 5D (i.e., FIGS. 5A-D), the illustrated graphs plot a function 510 on a plot of level of scaling (illustrated as "SCALING") versus the difference between a given priority value and another value (such as another priority value, a variance from an average, etc.) (illustrated as "PV DIFFERENCE").

Figure 5A:
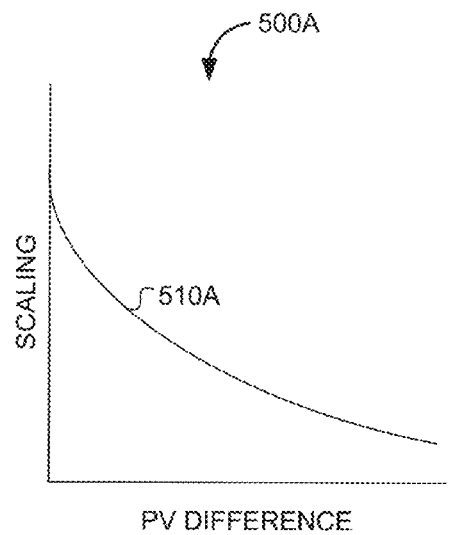
FIG. 5A is an example of a graph that illustrates scaling priority values, according to an embodiment of the invention.

FIG. 5A is an example of a graph 500A that illustrates scaling of priority values that decreases as a difference between a priority value and another value increases, according to an embodiment of the invention. A computing device (e.g., computing device 140) may perform scaling based on a function 510A. In some embodiments, the computing device may scale priority values without respect to whether a difference between priority values exceeds a predetermined threshold. For example, the computing device may scale priority values once a non-zero difference has been determined and may decrease the level of scaling as the difference increases. For these embodiments, as the difference increases, scaling may no longer be necessary because the priority values may cause haptic feedback to be dynamically generated that is sufficiently distinguishable from one another.

Figure 5B:
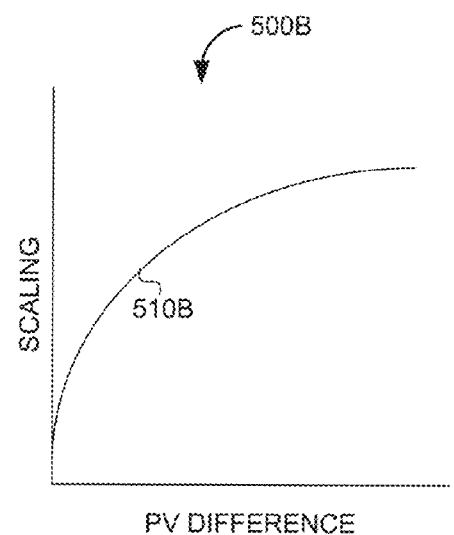
FIG. 5B is an example of a graph that illustrates scaling priority values, according to an embodiment of the invention.

FIG. 5B is an example of a graph 500B that illustrates scaling of priority values that increases as a difference between a priority value and another value increases, according to an embodiment of the invention. A computing device (e.g., computing device 140) may perform scaling based on a function 510B. In some embodiments, the computing device may scale priority values without respect to whether a difference between priority values exceeds a predetermined threshold. For example, the computing device may scale priority values once a non-zero difference has been determined and may increase the level of scaling as the difference increases. For these embodiments, as the difference increases, scaling may also be increased to further reinforce differences in audio, video, and/or other media content using dynamically generated haptic feedback.

Figure 5C:
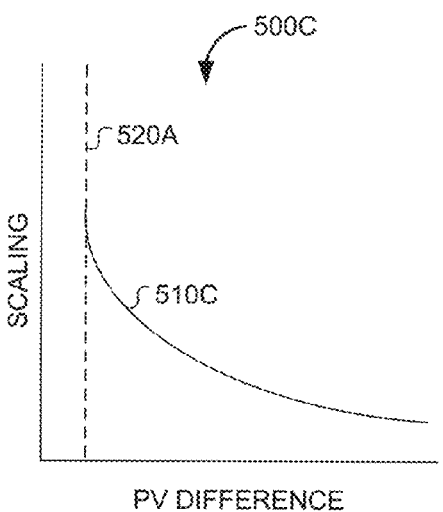
FIG. 5C is an example of a graph that illustrates scaling priority values, according to an embodiment of the invention.

FIG. 5C is an example of a graph 500C that illustrates scaling of priority values that decreases as a difference between a priority value and another value increases only after a threshold difference 520A has been met, according to an embodiment of the invention. A computing device (e.g., computing device 140) may perform scaling based on a function 510C. In some embodiments, the computing device may scale priority values only after the difference between priority values exceeds a predetermined threshold value 520A and may increase the level of scaling as the difference increases.

Figure 5D:
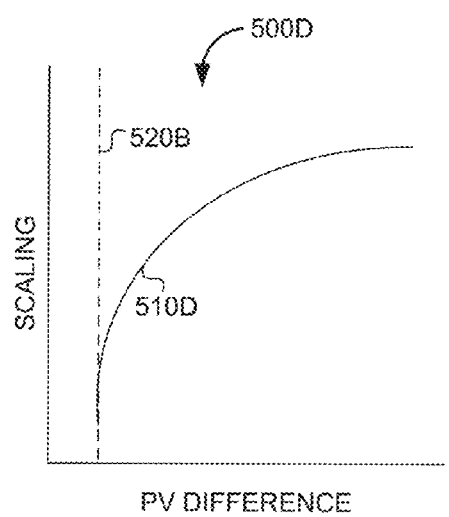
FIG. 5D is an example of a graph that illustrates scaling priority values, according to an embodiment of the invention.

FIG. 5D is an example of a graph 500D that illustrates scaling of priority values that increases as a difference between a priority value and another value increases only after a threshold difference 520B has been met, according to an embodiment of the invention. A computing device (e.g., computing device 140) may perform scaling based on a function 510D. In some embodiments, the computing device may scale priority values only after the difference between priority values exceeds a predetermined threshold value 520B and may decrease the level of scaling as the difference increases.

Although the functions illustrated in FIGS. 5A-5D are illustrated as non-linear, other forms and shapes may be used as well. For example, for at least some portion of any of the foregoing functions, scaling may be linear such that an amount of scaling increases linearly with the difference. Furthermore, a maximum and/or a minimum level of scaling may bound each of the functions such that scaling is capped or floored according to particular needs. Each of the threshold values, functions, maximums, minimums, etc., may be configured to suit particular needs.

Figure 6:
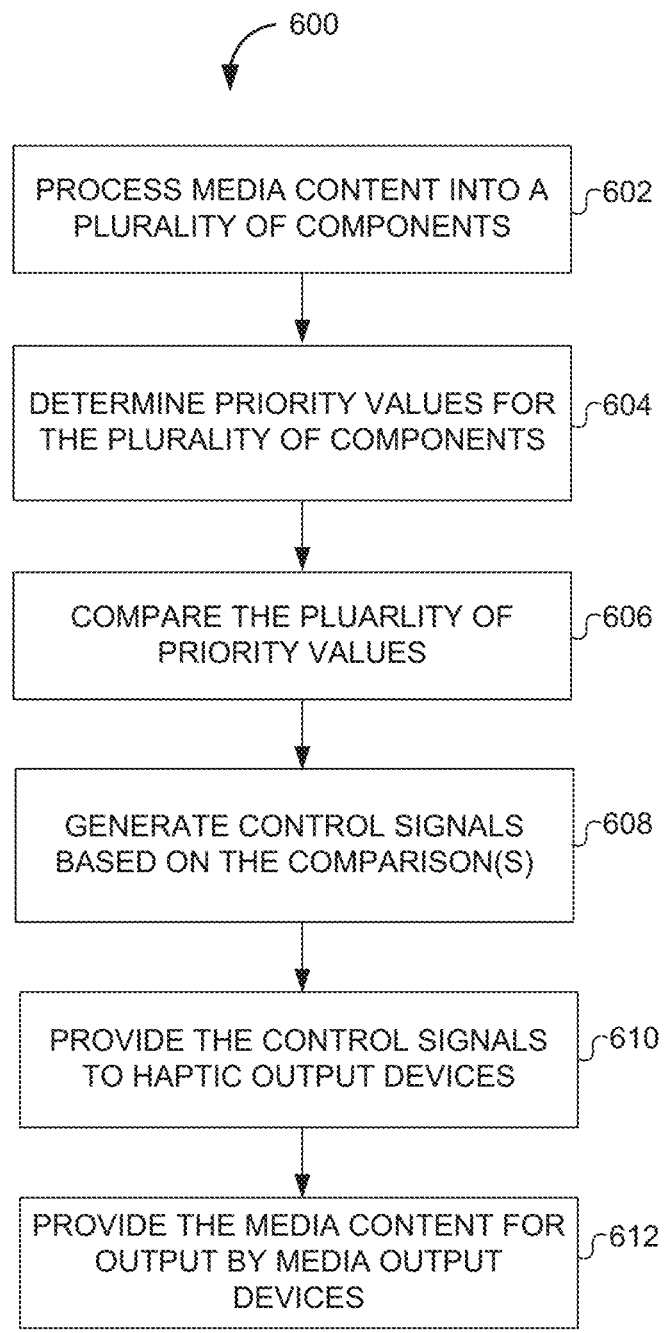
FIG. 6 illustrates an example of a process for providing haptic feedback based on dynamically scaled priority values of media components of media content, according to an embodiment of the invention.
Figure 7:
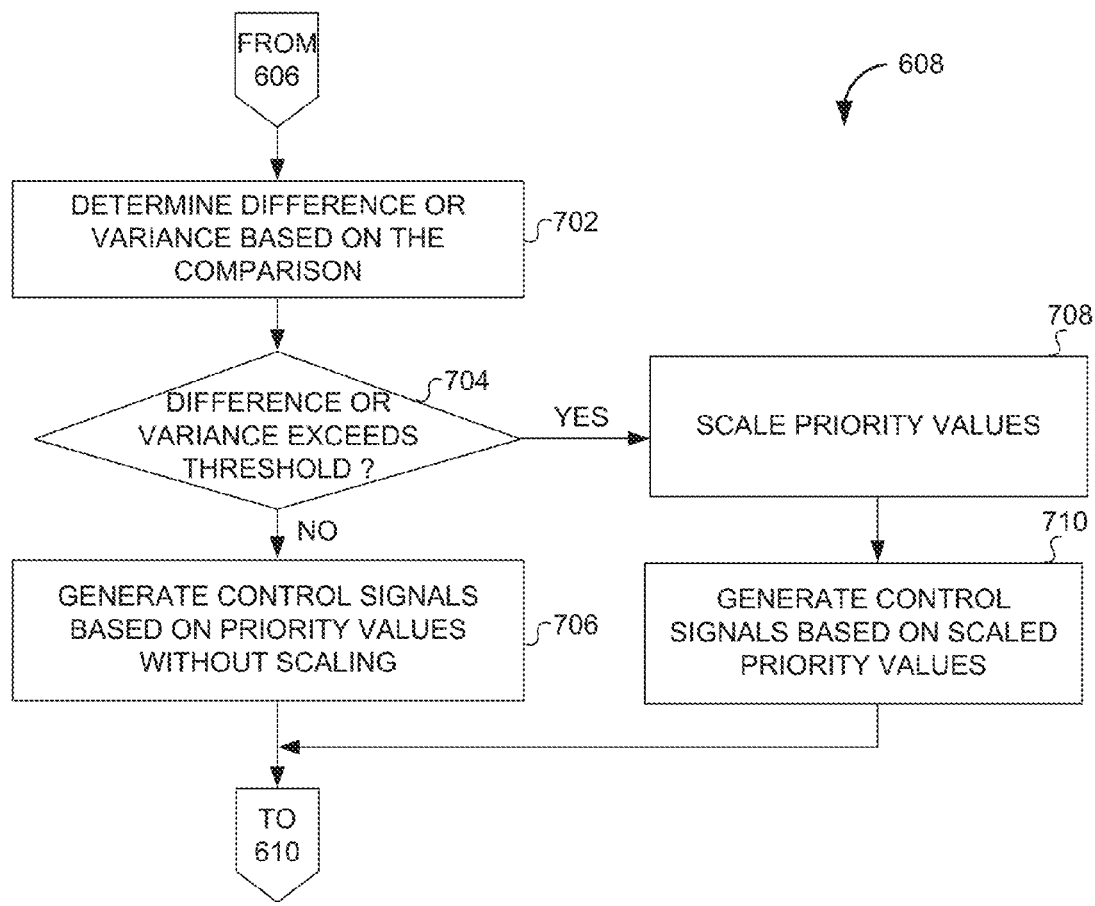
FIG. 7 illustrates an example of scaling priority values, according to an embodiment of the invention.
Figure 8:
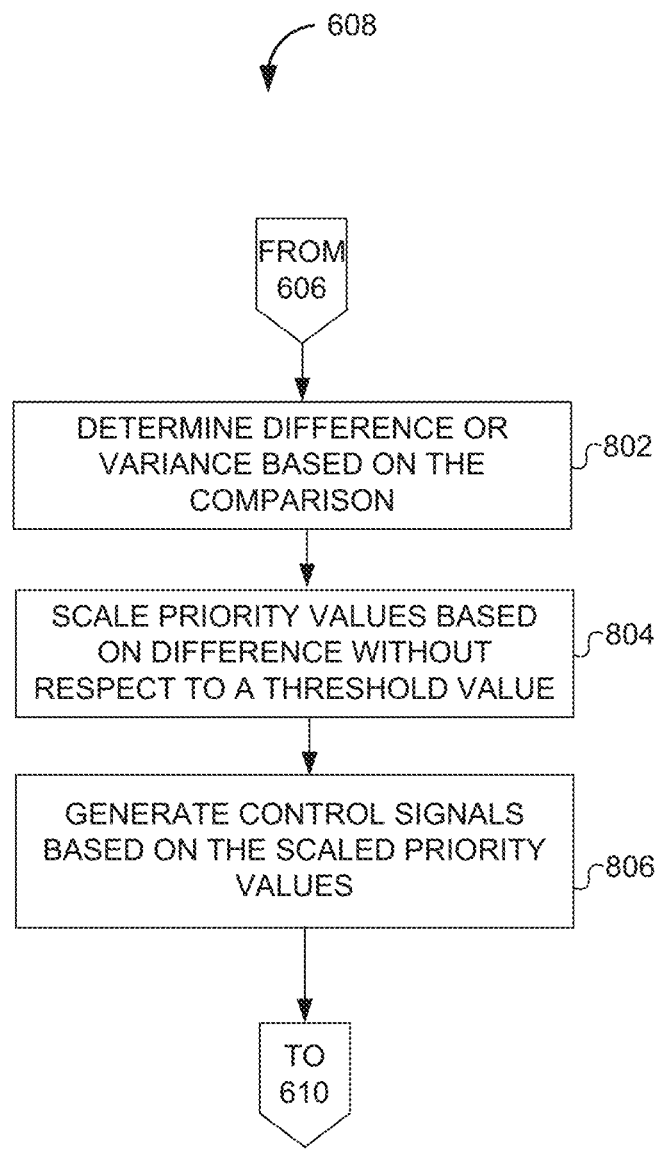
FIG. 8 illustrates an example of scaling priority values, according to an embodiment of the invention.
Figure 9:
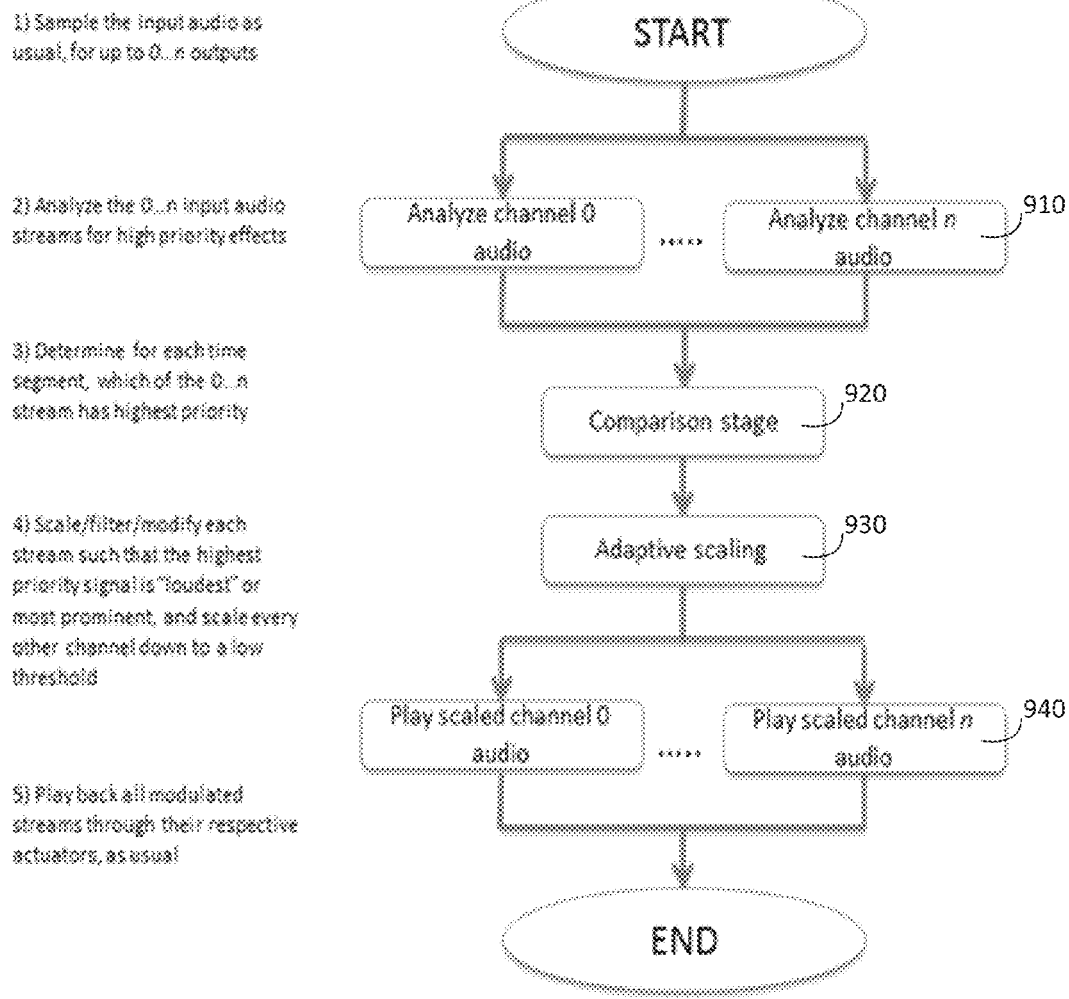
FIG. 9 illustrates an example of a process for providing haptic feedback based on input components of media content, according to an embodiment of the invention.

FIG. 6 illustrates an example of a process 600 for providing haptic feedback based on dynamically scaled priority values of media components of media content, according to an embodiment of the invention. In one embodiment, the functionality of the flow diagram of FIG. 6, as well as the functionality of the flow diagrams of FIGS. 7, 8, and 9 are each implemented by software stored in memory or other computer readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

The functionality depicted in the flowchart of FIGS. 6, 7, 8, and 9 are described in greater detail herein. The described functionality may be accomplished using some or all of the system components described in detail above. According to an aspect of the invention, the functionality may be performed in different sequences. In other embodiments, additional functionality may be performed along with some or all of the functionality shown in FIGS. 6, 7, 8 and 9, or some functionality may be omitted. In yet other embodiments, some or all of the functionality may be performed simultaneously. Accordingly, the functionality as illustrated (and described in greater detail below) is an example of functionality provided according to embodiments of the invention and, as such, should not be viewed as limiting.

At 602, media content may be processed into a plurality of media components. For example, the media content may include audio content, image content, and/or other types of content. The audio content may be processed into separate audio channels and the image content may be processed into different regions of an image and/or different streams of video (for example).

At 604, a priority value may be determined for each of the media components. The priority value may be determined based on various characteristics of the media component (e.g., audio level for audio and brightness level for images). At 606, the determined priority values may be compared. Such comparisons may include pairwise comparisons, comparisons of a given priority value with an average of priority values for the media components, and/or other comparisons.

At 608, control signals may be generated based on the comparisons. At 610, each control signal may be provided to a corresponding haptic output device, where the control signal causes a haptic feedback to be output. At 612, the media content may be provided to media output devices, which may include audio output devices, image output device, and/or other media output devices.

FIG. 7 illustrates an example of scaling priority values, according to an embodiment of the invention. In some embodiments, 608 of process 600 may include at least some of the following functionality based on comparisons of 606.

At 702, a difference may be determined based on the comparisons. At 704, a determination of whether the difference exceeds (e.g., is greater than or equal to) a predetermined threshold value may be made. If the difference does not exceed the predetermined threshold value, the control signals may be generated without scaling at 706. On the other hand, if the difference exceeds the predetermined threshold value, one or more of the priority values may be scaled at 708. The control signals may be generated based on the scaled priority values at 710.

FIG. 8 illustrates an example of scaling priority values, according to an embodiment of the invention. In some embodiments, 608 of process 600 may include at least some of the following functionality based on comparisons of 606. At 802, a difference may be determined based on the comparisons. At 804, the priority values may be scaled based on the difference without respect to whether such difference exceeds a predetermined threshold. At 806, the control signals may be generated based on the scaled priority values.

FIG. 9 illustrates an example of a process for providing haptic feedback based on input components of media content, according to an embodiment of the invention. The flow begins as input media content is processed into n input components, where n can be any number. In the illustrated embodiment of FIG. 9, input audio content is sampled into n input audio streams or channels. However, in alternate embodiments, input image content can be sampled into n input video streams or channels. The flow then proceeds to 910. At 910, one or more properties of the n input components are analyzed. Example properties can include a magnitude, a force output, a density, a texture, or any other type of property. In the illustrated embodiment, where the n input components are n audio input streams, a specific frequency range of each audio input stream such as a low frequency range, can be analyzed. The flow then proceeds to 920.

At 920, it is determined, for each time segment, which of the n input components have the highest priority by comparing priority values that are determined for the n input components. A priority value can be determined for each input component of the n input components based on the one or more analyzed properties of each input component. A priority value for each input component can be compared with a priority value for at least one other input component (or an aggregate value, such as an average). In an embodiment, a comparative threshold (e.g., 40% or any other percentage) can be defined, where the threshold may be required to be met in order for adaptive scaling (described below in greater detail in conjunction with 930) to occur. For example, if priority values of a plurality of input components are compared and determined to be within 40% of each other (i.e., do not meet the threshold), then the compared input components are considered to have the same priority, and no scaling is performed on the compared input components. However, if priority values of the input components are compared and determined not to be within 40% of each other (i.e., do meet the threshold), then the compared input components are considered to have different priorities, and scaling can be performed on one or more of the compared input components. In an alternate embodiment, an absolute threshold, rather than a comparative threshold, can be used. In this alternate embodiment, priority values of the n input components can be compared with the absolute threshold. If a priority value of an input component meets the threshold, scaling can be performed on the input component. Otherwise, if the input component does not meet the threshold, no scaling is performed on the input component. The flow then proceeds to 930.

At 930, one or more input components of the n input components are scaled based on the comparison of priority values of the n input components in 920. Input components that are determined to have a higher priority can be scaled up, input components that are determined to have a lower priority can be scaled down, or a combination of the two. By scaling an input component, according to an embodiment, one or more properties of the input component can be scaled. In an alternative embodiment, information used to generate haptic feedback based on the input component can be scaled, so that the input component is unaltered, and the haptic feedback is either stronger (when the information is scaled up) or weaker (when the information is scaled down). In yet another alternate embodiment, a priority value can be scaled, and the priority value can be used to generate the haptic feedback, where the haptic feedback is also based on the input component. By scaling the one or more input components, input components that are determined to have a higher priority can gain clarity, and are less likely to be overshadowed by the other input components. In an alternate embodiment, rather than scaling an input component, an input component can be modified (e.g., frequency-shifted or pitch-shifted) or filtered. In certain embodiments, no input components are scaled, and 930 is omitted. The flow then proceeds to 940.

At 940, the n input components are output to media output devices. In certain embodiments, control signals are generated based on the n input components, and the control signals are output to haptic output devices, where each control signal causes haptic feedback to be output. In the illustrated embodiment, where the n input components are n audio input streams, the n audio input streams can be output to audio output devices. In certain embodiments, fewer than n input components are output to media output devices. In these embodiments, input components that are determined to have a higher priority are output, and the remaining input components can be discarded. Further, in certain embodiments, a number of control signals that is fewer than n can be generated and sent to a number of haptic output devices that is also fewer than n. The flow then ends.

Thus, in one embodiment, a system can provide haptic feedback that varies spatially based on dynamically scaled values of media components. The system can scale one or more portions of the haptic feedback based on an analysis of the media components. In this manner, the system can improve the ability to distinguish between different haptic feedback that is provided in association with different media components and can provide a richer, more immersive media experience. In other words, the system can aid in creating a more spatialized haptic experience by highlighting and exaggerating difference in haptic feedback. For example, in a multi-channel experience, the system can distinguish a haptic effect associated with a channel from the other haptic effects associated with the other channels. This can result in an ideal multi-channel experience, creating a spatialization of haptic effects that is pleasing to users.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A computer-implemented method for providing haptic feedback based on media content, the computer-implemented method comprising:
   receiving the media content that includes a plurality of media components including at least a first channel and a second channel;
   generating, according to one of the plurality of media components, a haptic control signal; and
   transmitting, to a remote device, haptically-enabled media content comprising the haptic control signal and the media content, the haptically-enabled media content configured to cause the haptic feedback to be generated on the remote device,
   wherein the haptic feedback varies spatially causing the haptic feedback to be pronounced or diminished based on a scaled value or a priority value of at least one of the media components of the first channel or the second channel.

2. The computer-implemented method according to claim 1, wherein the media content is generated by a media capture device.

3. The computer-implemented method according to claim 2, wherein the media content generated by the media capture device is transmitted to the remote device in real-time.

4. The computer-implemented method according to claim 1, wherein the haptic control signal includes force information, the force information having a magnitude component.

5. The computer-implemented method according to claim 1, wherein the haptic control signal includes sensor information, the sensor information being associated with one of the plurality of media components.

6. The computer-implemented method according to claim 1, wherein the media content is synchronized with haptic feedback of the haptic control signal.

7. The computer-implemented method according to claim 1, wherein the media content comprises a video component.

8. A non-transitory computer readable storage medium storing one or more programs configured to be executed by a processor, the one or more programs comprising instructions for:
receiving media content that includes a plurality of media components including at least a first channel and a second channel;
generating, according to one of the plurality of media components, a haptic control signal; and
transmitting, to a remote device, haptically-enabled media content comprising the haptic control signal and the media content, the haptically-enabled media content configured to cause haptic feedback to be generated on the remote device,
wherein the haptic feedback varies spatially causing the haptic feedback to be pronounced or diminished based on a scaled value or a priority value of at least one of the media components of the first channel or the second channel.

9. The non-transitory computer readable storage medium according to claim 8, wherein the media content is generated by a media capture device.

10. The non-transitory computer readable storage medium according to claim 9, wherein the media content generated by the media capture device is transmitted to the remote device in real-time.

11. The non-transitory computer readable storage medium according to claim 8, wherein the haptic control signal includes force information, the force information having a magnitude component.

12. The non-transitory computer readable storage medium according to claim 8, wherein the haptic control signal includes sensor information, the sensor information being associated with one of the plurality of media components.

13. The non-transitory computer readable storage medium according to claim 8, wherein the media content is synchronized with haptic feedback of the haptic control signal.

14. The non-transitory computer readable storage medium according to claim 8, wherein the media content comprises a video component.

15. A device comprising:
a processor; and
a memory storing one or more programs for execution by the processor, the one or more programs including instructions for:
receiving media content that includes a plurality of media components including at least a first channel and a second channel;
generating, according to one of the plurality of media components, a haptic control signal; and
transmitting, to a remote device, haptically-enabled media content comprising the haptic control signal and the media content, the haptically-enabled media content configured to cause haptic feedback to be generated on the remote device,
wherein the haptic feedback varies spatially causing the haptic feedback to be pronounced or diminished based on a scaled value or a priority value of at least one of the media components of the first channel or the second channel.

16. The device according to claim 15, wherein the media content is generated by a media capture device and transmitted to the remote device in real-time.

17. The device according to claim 15, wherein the haptic control signal includes force information, the force information having a magnitude component.

18. The device according to claim 15, wherein the haptic control signal includes sensor information, the sensor information being associated with one of the plurality of media components.

19. The device according to claim 15, wherein the media content is synchronized with haptic feedback of the haptic control signal.

20. The device according to claim 15, wherein the media content comprises a video component.

21. The computer-implemented method according to claim 1, wherein the plurality of media components includes an audio component, and wherein the haptic feedback varies spatially according to a value of an audio characteristic.

22. The computer-implemented method according to claim 1, wherein the plurality of media components includes a video component, and wherein the haptic feedback varies spatially according to a color histogram.

* * * * *